(No Model.)
E. L. PERRY.
HOLLOW RUBBER ARTICLE.
No. 504,612. Patented Sept. 5, 1893.
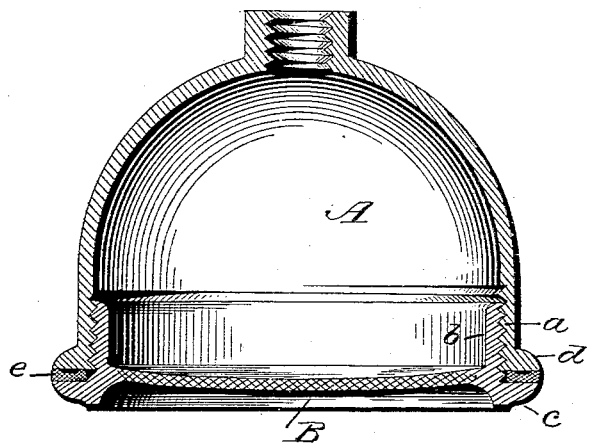
Witnesses
C. J. Williamson,
Geo. R. P. Goodwin,
Inventor
Edward L. Perry.
per Chas. H. Fowler
Attorney.

UNITED STATES PATENT OFFICE.

EDWARD L. PERRY, OF PATERSON, NEW JERSEY.

HOLLOW RUBBER ARTICLE.

SPECIFICATION forming part of Letters Patent No. 504,612, dated September 5, 1893.

Application filed June 16, 1893. Serial No. 477,809. (No model.)

*To all whom it may concern:*

Be it known that I, EDWARD L. PERRY, a citizen of the United States, residing at Paterson, in the county of Passaic and State of New Jersey, have invented certain new and useful Improvements in Hollow Rubber Articles; and I do hereby declare that the following is a full, clear, and exact description of the same, reference being had to the annexed drawing, making a part of this specification, and to the letters of reference marked thereon.

The present invention has reference to hollow rubber articles such as oil-cans and other like vessels for which a patent was granted to me April 5, 1892, No. 472,225, and is designed as an improvement thereon, and consists in the details of construction substantially as shown in the drawing and hereinafter described and claimed.

The accompanying drawing represents a sectional elevation of an oil-can or cup which is one form of hollow rubber articles to which my invention is applicable, A designating the body and B the detachable bottom.

The body of the article is composed of hard rubber or vulcanite with an interior screw thread $a$ to receive the screw threads upon the soft rubber bottom B. The projecting flange $c$ as well as the screw threaded flange $b$ are formed of hard rubber or vulcanite while the bottom is of soft rubber that will yield to form a flexible bottom to the oil-can or cup or when used on other hollow articles the bottom forms a cushion to prevent the article breaking from concussion should it fall or come in contact with any hard substance.

The bottom being of soft rubber it is necessary to reinforce it by a frame-work of hard rubber or vulcanite whereby the bottom is strengthened and prevented from collapsing, which I attain by the hard rubber or vulcanite flange or rim $c$. A further reinforcement of the soft rubber bottom is secured by the screw threaded flange $b$ which is also of hard rubber or vulcanite.

The screw threaded flange $b$ and flange or rim $c$ and also the bottom B are specially prepared to withstand the heat that is necessary for vulcanization, so that the flanges will vulcanize hard and the bottom vulcanize soft.

The body A has an outwardly and horizontally projecting flange $d$ and between this flange and the flange or rim $c$ is the elastic packing-ring $e$ which is compressed between the flanges to make a tight joint, the packing-ring may be either plain or grooved as found most preferable.

Having now fully described my invention, what I claim as new, and desire to secure by Letters Patent, is—

An oil-can or other hollow rubber article having a body of hard rubber or vulcanite, and a detachable bottom of soft rubber having a flange or rim and a screw flange both of hard rubber or vulcanite, said screw flange engaging with screw threads upon the interior of the body, substantially as and for the purpose set forth.

In testimony that I claim the above I have hereunto subscribed my name in the presence of two witnesses.

EDWARD L. PERRY.

Witnesses:
WM. F. BROWN,
WM. H. DE LACY.